Nov. 3, 1925.   1,559,858
F. E. FIELD
INDUCTANCE DEVICE
Filed July 25, 1923
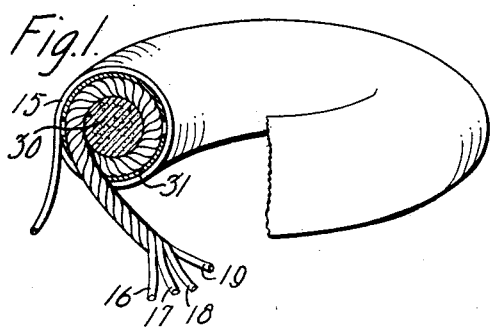
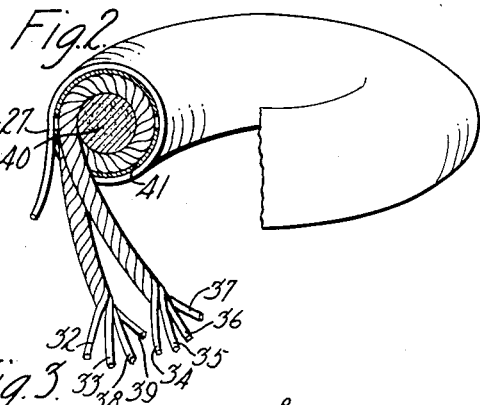
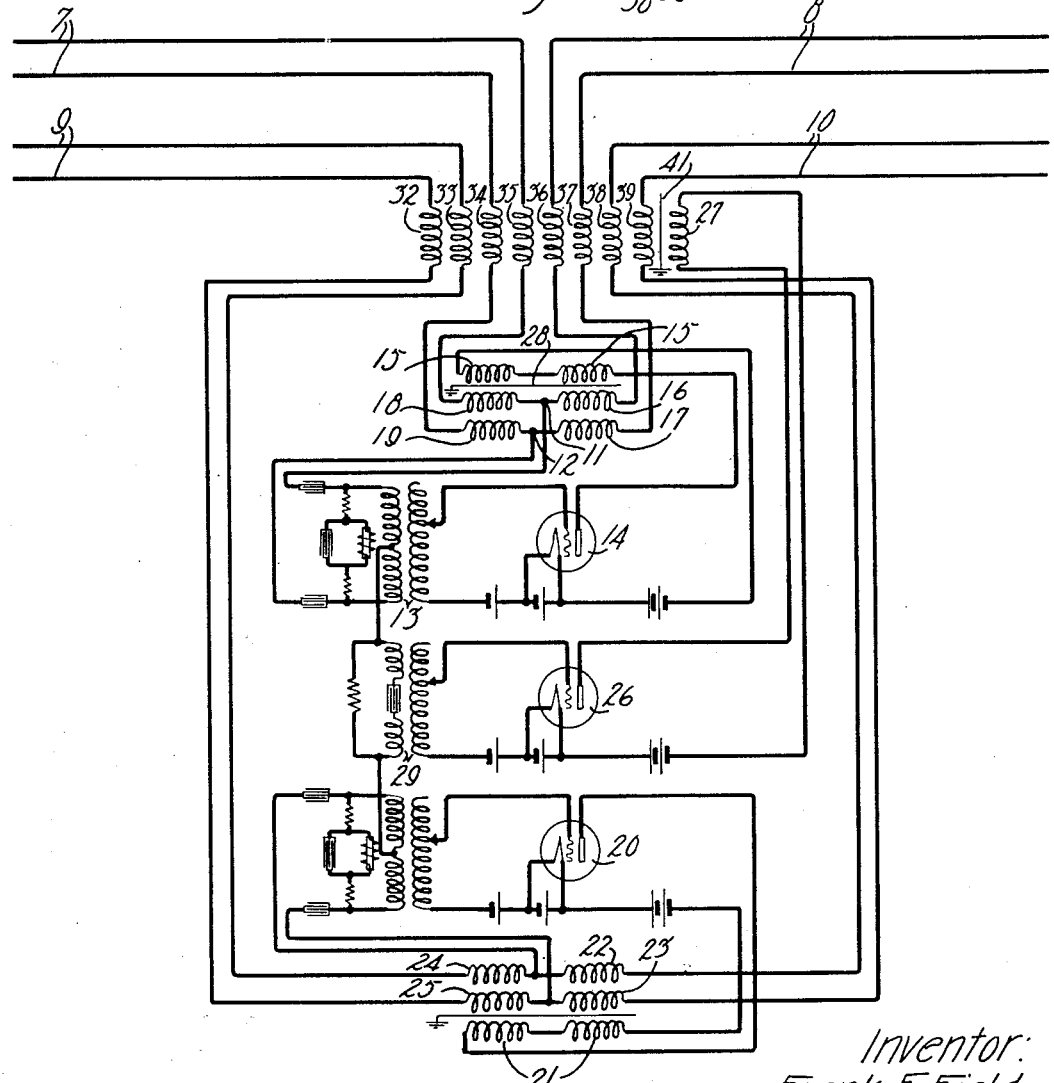
Inventor:
Frank E Field,
by Jol CR. Palmer Atty.

Patented Nov. 3, 1925.

1,559,858

UNITED STATES PATENT OFFICE.

FRANK E. FIELD, OF SOMERVILLE, NEW JERSEY, ASSIGNOR TO WESTERN ELECTRIC COMPANY, INCORPORATED, OF NEW YORK, N. Y., A CORPORATION OF NEW YORK.

INDUCTANCE DEVICE.

Application filed July 25, 1923. Serial No. 653,633.

*To all whom it may concern:*

Be it known that I, FRANK E. FIELD, a citizen of the United States, residing at Somerville, in the county of Somerset, State of New Jersey, have invented certain new and useful Improvements in Inductance Devices, of which the following is a full, clear, concise, and exact description.

This invention relates to inductance devices particularly of the type comprising a plurality of windings.

An object of this invention is to reduce capacity unbalance effects in an inductance device.

A particular form of this invention hereinafter described in detail comprises a transformer adapted for use as the output transformer for a 21 type phantom group repeater of the type, for example, described and claimed in the U. S. patent to Blackwell, No. 1,474,430, issued November 20, 1923. The side circuit output transformer in such a repeater comprises four line windings, two in series with each side of the line and a fifth winding inductively associated with the first four. The mid-points of the two pairs may be associated with the repeater input circuit while the fifth winding may be connected to the repeater output circuit.

In such a phantom repeater arrangement extreme care must be taken to guard against cross-talk between the side circuits and the phantom circuit and between the phantom circuit and the side circuits. One possible source of cross-talk trouble is capacity unbalance in the transformers employed, which, if present, tends to allow side circuit current to be impressed upon the phantom circuit repeater and the phantom current upon the side circuit repeater. Thus, crosstalk would be produced if, for example, the four line windings of the output transformer above described do not have equal natural capacity effects to adjacent objects, such as the casing, the core, or a grounded shield between the four windings and the fifth winding. In accordance with this invention, this source of possible crosstalk may be avoided by winding the four line windings as a twisted quad around the transformer core, surrounding the quad with a grounded shield and winding the fifth or secondary winding around the shield. The four windings of the twisted quad will then be located the same average distance away from both the core and the shield so that the natural capacities of the windings to the shield are equal and the natural capacities of the windings to the core are equal. The symmetrical and balanced capacity arrangement thereby produced eliminates the possibility of the objectionable crosstalk between side and phantom circuits.

Referring to the drawings:

Fig. 1 illustrates a side circuit output transformer for a phantom group repeater. Fig. 2 represents a phantom circuit output transformer for a phantom group repeater and Fig. 3 illustrates a circuit arrangement in which the transformers of Figs. 1 and 2 may be employed.

The signaling system disclosed in Fig. 3 comprises a side circuit composed of two line sections 7 and 8 connected serially and a second side circuit comprising two line sections 9 and 10 connected serially. Incoming telephone current, for example, from line 7, will be impressed upon the mid-points 11 and 12 of the side circuit output transformer and then through the side circuit input transformer 13 upon the input terminals of a vaccum tube amplifier 14. The currents amplified by repeater 14 will be impressed by the primary winding 15 upon the secondary windings 16, 17, 18, and 19 of the side circuit output transformer, whereby half of the amplified energy is impressed upon line section 7 and the other half is impressed upon line section 8. In a similar manner, signaling currents in line section 9 will be impressed upon the other side circuit repeater 20 and the amplified currents by the primary winding 21 will be impressed upon the line windings 22, 23, 24 and 25 on the other side circuit output transformer, whereby half of the amplified energy will be impressed upon line section 9 and the other half will be impressed upon line section 10. Phantom circuit currents traversing in one direction, for example, the two wires of the line section 7 in parallel, returning over the two wires of line section 9 in parallel will be impressed upon the phantom repeater 26 by the input transformer 29, as described in detail in the above mentioned Blackwell patent. The amplified phantom circuit currents by primary winding 27 will be impressed upon the eighth line windings of the phantom output circuit transformer.

In such a circuit arrangement extreme care must be taken to guard against cross-talk between the side circuits and the phantom circuit and between the phantom circuit and the side circuits. For example, if the windings 16, 17, 18 and 19 of one of the side circuit transformers have different natural capacity effects to the grounded shield 28, the phantom circuit currents flowing in the two wires of line sections 7 and 8 will be unequal, thereby tending to produce a potential difference between the mid-points 11 and 12, which should, however, be at the same potential in order to prevent phantom circuit currents from being impressed upon the side circuit repeater 14.

In accordance with this invention the natural capacities of the four windings 16 to 19 to the shield 28 may be made equal to each other by winding these four windings as a twisted or spiral quad. The average distance between each of the four windings and the shield 28 will therefore be the same so that the capacity between the windings and the shield will be equal. Equal capacities between these windings and the shield will insure that the mid points 11 and 12 will be at the same potential for phantom circuit currents as far as capacity effects in the transformer are concerned. Care, of course, should also be taken that the four windings 16 to 19 are also of equal inductance for otherwise an inductance unbalance would exist which would tend to produce cross-talk in a similar manner.

The transformer arrangement which may be employed for the side circuit transformer just described is illustrated in Fig. 1 in which a toroidal core member 30 is surrounded by a uniformly distributed spiral quad comprising the windings 16, 17, 18 and 19. After the spiral quad has been wound around the core in a suitable number of layers to obtain the required inductance the quad is covered by a suitable metallic shield 31, after which the primary winding 15 is applied. A similar arrangement may, of course, be employed for the other side circuit transformer comprising the four line windings 22 to 25 and the primary winding 21.

The phantom circuit output transformer comprising the primary winding 27 and the line windings 32 to 39, inclusive may be insured a capacity balance in a similar manner. As shown in Fig. 2, windings 32, 33, 38 and 39 of one side circuit may be wound as a twisted quad around the core 40 while the line windings 34, 35, 36 and 37 of the other side circuit may be wound as a twisted quad maintained in parallel relation with the other quad. After the shield 41 has been applied over the two twisted quads, the secondary winding 27 may be wound in a suitable number of layers.

It is to be understood that this invention is capable of use in various types of devices other than those described above in which it is desired to reduce capacity unbalance effects between a plurality of inductance windings on a common core structure.

The invention claimed is:

1. A transformer comprising a core, a winding mounted on said core in the form of a spiral quad, a second winding inductively associated with said quad, and a shield between said quad and said second winding.

2. A transformer comprising a core, a winding mounted on said core comprising four conductors wound as a spiral quad, a metallic covering surrounding said quad, and a second winding surrounding said covering.

3. A transformer comprising a plurality of windings, one of said windings comprising four separate conductors wound as a twisted quad, one pair of said conductors being serially connected, the other pair of said conductors being serially connected, leads forming terminals from the mid points of said pairs, said four conductors having equal natural capacities to the adjacent parts of said transformer to maintain said mid points at the same potential for currents flowing in parallel through said pairs.

4. A transformer comprising a core, a winding of a plurality of sections wound on said core, and a second winding of a plurality of sections wound on said core, all the conductors of said sections of the two windings being twisted together as a unitary cord, and being symmetrically and similarly disposed about said core to equalize the natural capacity effects between all of said sections and the other adjacent parts of said transformer, and an electrostatic shield for said windings.

5. A transformer comprising a covering, and four windings of equal inductance wound as a twisted quad, and arranged in such a manner as to maintain the capacity between each winding and said covering equal.

In witness whereof, I hereunto subscribe my name this 18th day of July A. D., 1923.

FRANK E. FIELD.